E. L. HILL.
SKID CHAIN TIGHTENER.
APPLICATION FILED MAY 22, 1920.
1,390,613.
Patented Sept. 13, 1921.
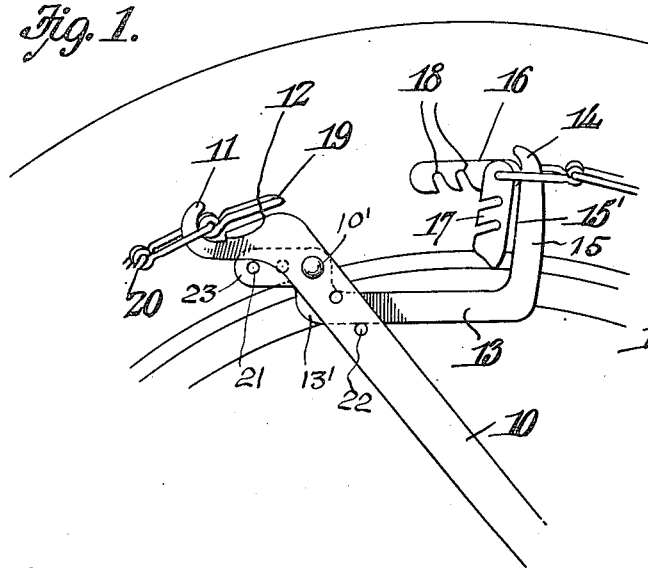
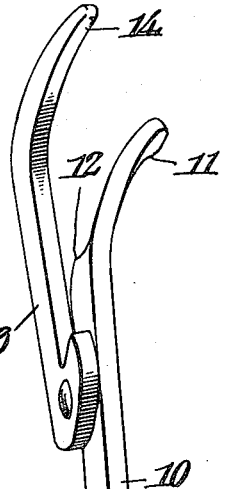
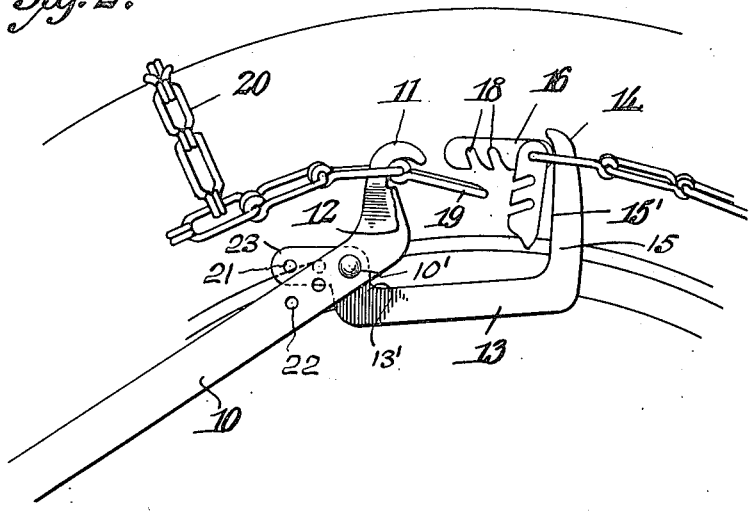
Elmer L. Hill, INVENTOR.
BY
ATTORNEY.

UNITED STATES PATENT OFFICE.

ELMER L. HILL, OF RAPELJE, MONTANA.

SKID-CHAIN TIGHTENER.

1,390,613.  Specification of Letters Patent.  Patented Sept. 13, 1921.

Application filed May 22, 1920. Serial No. 383,421.

*To all whom it may concern:*

Be it known that I, ELMER L. HILL, a citizen of the United States, residing at Rapelje, in the county of Stillwater, State of Montana, have invented certain new and useful Improvements in Skid-Chain Tighteners, and I do hereby declare the following to be a full, clear, and exact description of the invention, such as will enable others skilled in the art to which it appertains to make and use the same.

This invention relates to new and useful improvements in tightening devices and particularly devices for tightening automobile skid chains.

One object of the invention is to provide a novel and improved device of this character whereby the ends of the chain will be prevented from slipping outwardly toward the hand of the operator, when the device is operated to place the chain under tension.

Another object is to provide a novel and improved device of this character which is constructed to permit the operator to easily grasp the ends of the chain to properly engage them.

Another object is to provide a novel and improved device of this character which will hold the pivoted and notched connecting member, of the chain, in proper position for easy engagement with the other end of the chain.

Other objects and advantages will be apparent from the following description when taken in connection with the accompanying drawing.

In the drawing:

Figure 1 is a side elevation of a portion of a wheel and tire, with the chain thereon, and the invention in position for drawing the ends of the chain together.

Fig. 2 is a similar view showing the position of the parts when the chain ends have been drawn together.

Fig. 3 is a perspective view of the device removed from the chain.

Referring particularly to the accompanying drawing, 10 represents a lever of the desired length and strength, and having a hook 11 formed on one end, which is laterally offset, as seen in Fig. 3. At the inner end of this hook, and in the concave edge thereof, there is formed a shoulder 12, the purpose of which will presently appear. A substantially U-shaped frame 13 is pivotally connected by its shorter arm 13' to the lever 10, inwardly of the shoulder 12. The other or outer arm 15 is formed with a terminal hook 14, the inner edge face of said arm, inwardly of the hook, being straight, as indicated at 15', for engagement thereagainst of the notched cover 17 of the connector block 17, which has the notches 18 for interchangeable engagement with the other end link of the side chain 19. The shorter arm 13' of the frame 13, is formed with an angular extension 23, directed away from the the longer arm 15 and in which are formed the series of openings 21 for the reception of the pivot pin 10' of the lever. The lever 10, is also formed with a series of openings 22, to receive the pivot pin 10'. This arrangement permits ready adjustment of the device to chains of different sizes.

In the operation of the device, the hook 11 is engaged with the end link of the side chain 20 which carries the connector, while the other hook 14 is engaged with the end link on the other end of the side chain. It will be noted, upon reference to Fig. 1, that the inner end of the block 16 of the connector bears against the flat edge face 15', of the longer arm 15 of the frame 13, and that the notched block 16 is disposed in an extended position toward the other end of the chain. By rocking the lever 10, in a direction away from the hook 14, the hook 11 will draw its engaged end of the side chain toward the connecting member 17, while the arm 16 will be drawn over toward the hook 11, with the result that the connecting member will be positioned so as to readily engage with the end link. When the lever is thus rocked, the shoulder 12 prevents the link which is engaged therewith, from sliding downwardly on the hook in a direction toward the pivot of the lever 10.

In the ordinary construction of devices of this character, when the lever is swung over to draw the ends of the side chain together, the end link, on one end of the chain, which engages with the hook of the lever, has a tendency to slide back on the lever, with the result that the leverage is changed, and the ends of the side chain moved out of line. This prevents the proper engagement of the connecting member with the other end link of the chain. The shoulder 12, of the present device, effectively prevents this movement of the link on the lever, said link being maintained in its proper position within the hook.

Attention is also particularly called to the other hook 14, and especially to its straight edge face 15', whereby the connector block 16, of the side chain, is held in proper extended position for engagement with the other end link of the chain, while the cover plate 17 is held out of the way. By this construction the notched portion is held in extended position.

Also, the great width of the frame 13, in U-shape, provides ample space between its arms to permit the operator to readily and easily grasp and manipulate the connecting member and the other end links, into proper engagement.

While the device is shown in connection with an automobile skid chain, I wish it understood that the device may be used in tightening other chains, such as sprocket chains, on driving mechanisms of binders, or other farm machinery.

What is claimed is:

A skid chain tightener comprising a frame including a long arm having a terminal hook and a short arm spaced materially therefrom and having a right-angular extension directed away from the first arm and provided with a longitudinal series of perforations, and a lever having a hook at one end in opposed relation to the first-named hook, and a pivot passed through the lever and one of said perforations and adjustable from one to another thereof.

In testimony whereof I have affixed my signature in the presence of two witnesses.

ELMER L. HILL.

Witnesses:
W. J. SODERLIND,
ALBERT A. GOETULD.